United States Patent
Ohno (10) Patent No.: US 8,041,457 B2
(45) Date of Patent: Oct. 18, 2011

(54) ROBOT, CONTROL METHOD THEREFOR AND CONTROL PROGRAM THEREFOR

(75) Inventor: Nobuyuki Ohno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 991 days.

(21) Appl. No.: 11/948,336

(22) Filed: Nov. 30, 2007

(65) Prior Publication Data

US 2008/0133058 A1   Jun. 5, 2008

(30) Foreign Application Priority Data

Dec. 1, 2006   (JP) .................................. 2006-325757

(51) Int. Cl.
*G05D 15/00* (2006.01)

(52) U.S. Cl. .................... 700/259; 901/2; 901/3; 901/9; 901/36; 901/39; 294/86.4; 294/907; 294/106; 294/111; 294/902; 318/568.12; 318/568.16; 318/568.21; 382/153; 57/279

(58) Field of Classification Search .................. 901/2, 3, 901/9, 36, 39, 47, 49; 294/86.4, 88, 106, 294/111, 902, 907; 318/568.12, 568.16, 318/568.21; 382/153; 414/744; 57/279
See application file for complete search history.

(56) References Cited

U.S. PATENT DOCUMENTS

| | | | | |
|---|---|---|---|---|
| 6,484,068 | B1 * | 11/2002 | Yamamoto et al. | 700/245 |
| 6,832,131 | B2 * | 12/2004 | Hattori et al. | 700/245 |
| 6,917,175 | B2 * | 7/2005 | Hattori et al. | 318/567 |
| 7,013,201 | B2 * | 3/2006 | Hattori et al. | 700/245 |
| 7,027,031 | B2 * | 4/2006 | Kawasaki et al. | 345/156 |
| 7,107,107 | B2 * | 9/2006 | Morikawa et al. | 700/31 |
| 7,168,748 | B2 * | 1/2007 | Townsend et al. | 294/106 |
| 7,180,401 | B2 * | 2/2007 | Kurtz | 340/5.52 |
| 7,370,896 | B2 * | 5/2008 | Anderson et al. | 294/106 |
| 7,463,948 | B2 * | 12/2008 | Orita | 700/245 |
| 7,642,894 | B2 * | 1/2010 | Kurtz | 340/5.52 |
| 2006/0155263 | A1 * | 7/2006 | Lipow | 606/1 |
| 2006/0167564 | A1 * | 7/2006 | Flaherty et al. | 623/57 |

FOREIGN PATENT DOCUMENTS

| | | |
|---|---|---|
| JP | 05-185388 | 7/1993 |
| JP | H07-04491 | 1/1995 |
| JP | 08-197467 | 8/1996 |
| JP | 08-274143 | 10/1996 |
| JP | 08-318491 | 12/1996 |
| JP | 2004-249391 | 9/2004 |
| JP | 2005-164323 | 6/2005 |
| JP | 2006-297542 | 11/2006 |

* cited by examiner

*Primary Examiner* — James Trammell
*Assistant Examiner* — McDieunel Marc
(74) *Attorney, Agent, or Firm* — Rankin, Hill & Clark LLP (57) ABSTRACT

A robot configured to check whether an object is properly grasped by a hand determines whether the position and posture of a handle (object), determined based on an image obtained by a camera (external information), and the position and posture of the handle in the case where the handle is assumed to be properly grasped, determined from the posture of a robot based on an output or the like of a rotary encoder (internal information), agree with each other. In response to the determination of whether the external information and the internal information agree with each other, it is determined whether the handle is properly grasped based on a force detected by a six-axis force sensor provided on each hand.

14 Claims, 6 Drawing Sheets

ROBOT, CONTROL METHOD THEREFOR AND CONTROL PROGRAM THEREFOR

BACKGROUND OF THE INVENTION

1. Field of the Invention

The present invention relates to a robot or the like that has a function of an autonomous movement and a function of grasping an object with a hand.

2. Description of the Related Art

There has been proposed a method of enabling a robot capable of the autonomous movement to recognize a mark on a handle of a cart C by means of an infrared camera mounted on the robot to wheel the cart C (see Japanese Patent Laid-Open No. 2005-164323, paragraphs 0100 and 0101 and FIG. 17).

SUMMARY OF THE INVENTION

However, there is a possibility that the robot moves to wheel the cart C when the robot does not properly grasp the handle (when the robot fails to grasp the handle), and as a result, the cart C is moved in an unexpected direction. Conventionally, to avoid this, a person visually checks whether or not the robot properly grasps the handle with a hand thereof.

Thus, an object of the present invention is to provide a robot or the like that can check by itself whether or not the robot properly grasps an object with a hand thereof.

A robot according to a first aspect of the present invention has a control system and has functions of autonomously moving and using one or more hands to grasp an object under the control of the control system, and the control system comprises: a first recognition processing section that recognizes the position and posture of the object as external information based on an output signal of a first sensor that measures the position and posture of the object; a second recognition processing section that recognizes, as internal information, the position and posture of the object in a case where the object is assumed to be properly grasped by the one or more hands based on an output signal of a second sensor that measures the position and posture of the one or more hands; a primary confirmation processing section that determines whether a primary grasping condition that the external information recognized by the first recognition processing section and the internal information recognized by the second recognition processing section agree with each other is satisfied or not; and a secondary confirmation processing section that measures the direction or the direction and magnitude of a force exerted by the one or more hands on the object when the position, the posture or the position and posture of the one or more hands are changed when the robot is in a stationary state based on an image of the object obtained by an image pickup device mounted on the robot or an output signal of a force sensor provided on the one or more hands and determines whether a secondary grasping condition that the direction of the force agrees with a first target direction, or the direction and magnitude of the force agree with the first target direction and a first target value, respectively, is satisfied or not in a case where the primary confirmation processing section determines that the primary grasping condition is satisfied.

The robot according to the first aspect determines whether the object is properly grasped or not based on whether the external information and the internal information agree with each other, in the primary confirmation processing. Furthermore, in the secondary confirmation processing, it is determined whether the object is properly grasped or not based on whether the direction or the direction and magnitude of the force(s) (referred to as "direction or the like of the force(s)" as required hereinafter) exerted by one or more hands on the object when the robot is in the stationary state. Thus, the robot can confirm whether the one or more hands properly grasp the object or not based on such dual determinations. The confirmation allows the robot to start moving with the object grasped by the one or more hands. Furthermore, it is possible to prevent the robot from colliding with a stationary object because the robot starts moving when the object is improperly grasped and therefore the hands are separated from the object, for example.

In this specification, when it is described that an object is "properly" grasped, it means that that the robot grasps the object with the one or more hands in such a manner that the object moves together with the robot when the robot moves, for example. Furthermore, when measuring the force exerted by the hands on the object based on the image obtained by the image pickup device, the acceleration of the object determined from the image and the mass of the object (previously stored in a memory of a computer constituting the control system, for example) are used.

A robot according to a second aspect of the present invention is the robot according to the first aspect of the present invention in which the secondary confirmation processing section determines whether the object is properly grasped by the plurality of hands or not while controlling the operation of the robot in such a manner that the resultant of the forces exerted by the plurality of hands on the object equals to 0.

The robot according to the second aspect of the present invention determines whether the object is properly grasped or not based on the direction or the direction and magnitude of the force exerted on each of a plurality of hands. When performing the determination, the operation of the robot is controlled so that the resultant of the forces exerted by the plurality of hands on the object equals to 0. Thus, if the object is properly grasped, it is possible to avoid reduction of accuracy of the determination and collision of the object with the robot due to an unwanted movement of the object during the determination.

A robot according to a third aspect of the present invention is the robot according to the first aspect of the present invention in which the control system further comprises a tertiary confirmation processing section that changes the position, the posture or the position and posture of the one or more hands after the robot starts moving, measures the direction or the direction and magnitude of a force exerted by the one or more hands on the object based on an image of the object obtained by the image pickup device or an output signal of the force sensor, and determines whether a tertiary grasping condition that the direction of the force exerted agrees with a second target direction, or the direction and magnitude of the force agree with the second target direction and a second target value, respectively, is satisfied or not in the case where the secondary confirmation processing section determines that the object is properly grasped by the one or more hands while satisfying said secondary grasping condition.

The robot according to the third aspect of the present invention further determines whether the object is properly grasped or not based on the direction or the like of the force(s) exerted by the one or more hands on the object when the robot is in the stationary state in the tertiary confirmation processing. Thus, it is possible to recognize, with reliability, a situation in which the object, which has been "properly" grasped by the hands when the robot is in the stationary state, becomes "improperly" grasped by the hands after the robot starts moving because the hands are separated from the object.

A robot according to a fourth aspect of the present invention is the robot according to the third aspect of the present invention in which the control system stops the operation for moving of the robot in the case where the tertiary confirmation processing section determines that the tertiary grasping condition is not satisfied.

The robot according to the fourth aspect of the present invention stops the operation for moving in response to determination that the object is "improperly"grasped by the hands after the robot starts moving. Thus, it is possible to prevent the robot from continuing to move in spite of the object being improperly grasped and therefore colliding with the object.

A robot according to a fifth aspect of the present invention is the robot according to the first aspect of the present invention in which, in the case where the secondary confirmation processing section determines that the secondary grasping condition is not satisfied, the control system controls the operation of the robot in such a manner that either or both of the position and the posture of the one or more hands is changed, and then, the secondary confirmation processing section determines again whether the object is properly grasped by the plurality of hands or not.

The robot according to the fifth aspect of the present invention repeatedly performs the determination by changing either or both of the position and the posture of the hands in the case where it is determined that the object is improperly grasped based on the direction or the like of the force exerted on the hands. Thus, even in a situation in which it is determined that the object is improperly grasped based on whether the secondary grasping condition concerning the force exerted on each of the plurality of hands is satisfied although it is determined that the object is properly grasped based on whether the primary grasping condition is satisfied, the operation of the robot can be appropriately corrected in such a manner that the object becomes properly grasped.

A method according to a sixth aspect of the present invention is a control method for a robot that has functions of autonomously moving and using one or more hands to grasp an object, in which the control method comprises: a step of performing first recognition processing for recognizing the position and posture of the object as external information based on an output signal of a first sensor that measures the position and posture of the object; a step of performing second recognition processing for recognizing, as internal information, the position and posture of the object in a case where the object is assumed to be properly grasped by the one or more hands based on an output signal of a second sensor that measures the position and posture of the one or more hands; a step of performing primary confirmation processing for determining whether a primary grasping condition that the external information recognized in the first recognition processing and the internal information recognized in the second recognition processing agree with each other is satisfied or not; and a step of performing secondary confirmation processing for measuring the direction or the direction and magnitude of a force exerted by the one or more hands on the object when the position, the posture or the position and posture of the one or more hands are changed when the robot is in a stationary state based on an image of the object obtained by an image pickup device mounted on the robot or an output signal of a force sensor provided in the one or more hands, and determining whether a secondary grasping condition that the direction of the force agrees with a first target direction, or the direction and magnitude of the force agree with the first target direction and a first target value, respectively, is satisfied or not in a case where it is determined that the primary grasping condition is satisfied in the primary confirmation processing.

According to the method according to the sixth aspect of the present invention, the robot can confirm whether the object is properly grasped by the hands through dual determinations including a determination (1) of whether the primary grasping condition concerning agreement between the internal information and the external information is satisfied and a determination (2) of whether the secondary grasping condition concerning the direction or the like of the force exerted by the hands on the object is satisfied.

A program according to a seventh aspect of the present invention makes a computer installed in the robot according to the first aspect of the present invention function as the control system.

The program according to the seventh aspect of the present invention can make a computer installed in the robot function as a system that confirms whether the object is properly grasped by the hands through dual determinations including a determination (1) of whether the primary grasping condition concerning agreement between the internal information and the external information is satisfied and a determination (2) of whether the secondary grasping condition concerning the direction or the like of the force exerted by the hands on the object is satisfied.

DETAILED DESCRIPTION OF THE PREFERRED EMBODIMENTS

A robot according to an embodiment of the present invention will be described with reference to the drawings.

First, a configuration of the robot will be described with reference to FIGS. 1 and 2.

Figure 1:
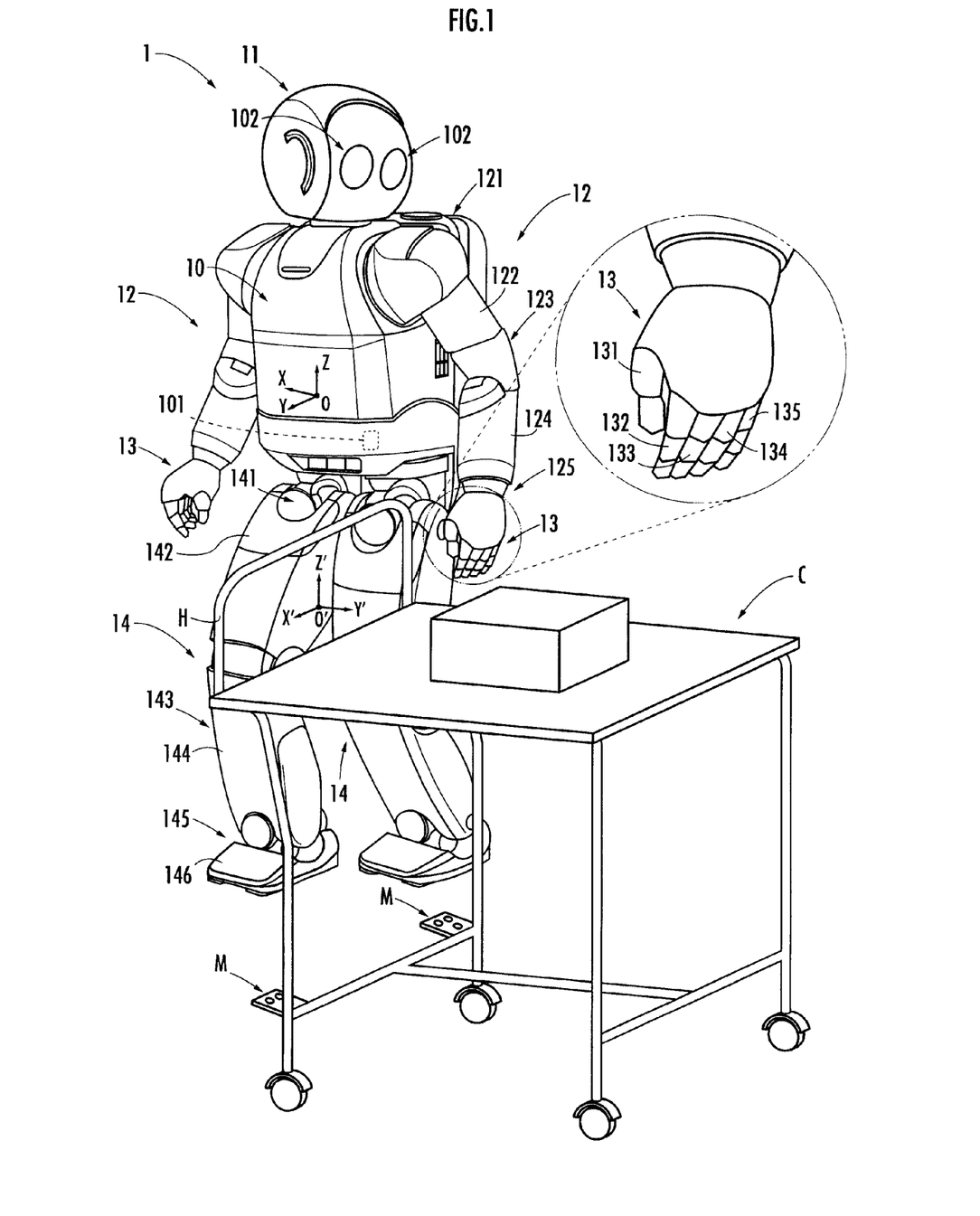
FIG. 1 is a diagram for illustrating a configuration of a robot according to the present invention.
Figure 2:
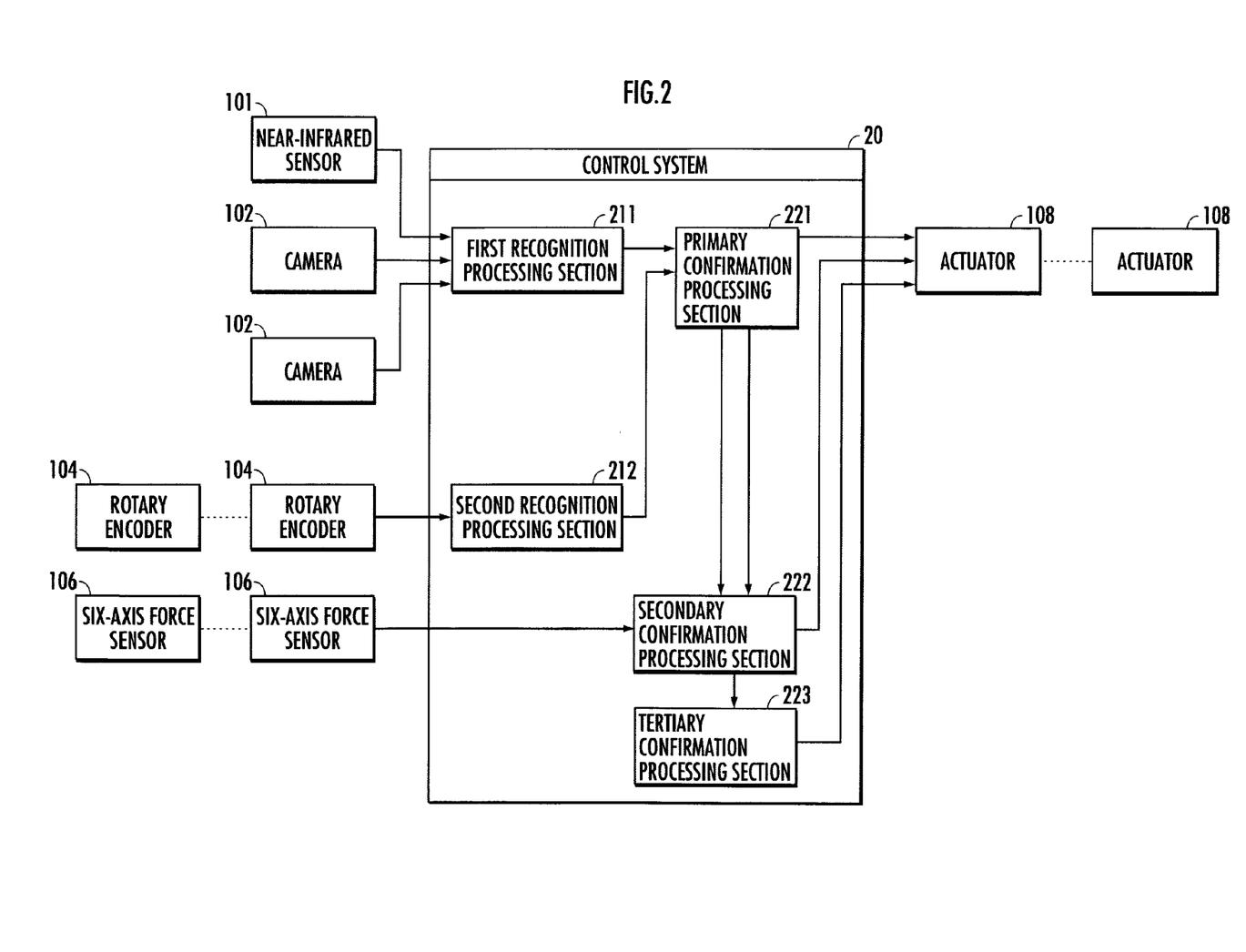
FIG. 2 is a diagram for illustrating the configuration of the robot according to the present invention.

A robot 1 shown in FIG. 1 is a legged mobile robot and, like a human being, comprises a trunk 10, a head 11 disposed on the trunk 10, left and right arms 12 disposed at an upper part of the trunk 10 and extending from the opposite sides of the upper part of the trunk 10, hands 13 attached to the tips of the left and right arms 12, and left and right legs 14 disposed at and extending downward from the bottom of the trunk 10. In addition, the robot 1 has a control system 20 for controlling the operation thereof.

The trunk 10 is composed of an upper part and a lower part that are vertically coupled to each other in such a manner that the upper and lower parts can relatively rotate with respect to each other about the yawing axis. A waist camera (camera) 101 having an image pickup range which covers an area forward and downward from the robot 1, is incorporated in a lower part of the trunk 10. The waist camera 101, which detects near-infrared light emitted from a near-infrared lamp (not shown) toward an area forward and downward of the robot 1 and reflected from an object, is used to determine the position or the like of the object.

The head 11 is capable of a movement, such as rotation about the yawing axis with respect to the trunk 10. A pair of left and right head cameras 102 are mounted on the head 11. The head camera 102 may be a camera designed for sensing light in various frequency bands, such as a CCD camera and an infrared camera. As a "first sensor", one of the waist camera 101 and the head cameras 102 may be used. Alternatively, various sensors, such as a millimeter wave radar and an ultrasonic sensor, or a combination thereof may be used. A single head camera 102, rather than the stereo head cameras 102, may be mounted on the head 11. Furthermore, the position and posture of a handle H in a robot coordinate system can be recognized by database searching or by using GPS.

The arm 12 comprises a first arm link 122 and a second arm link 124. The first arm link 122 is connected to the trunk 10 by a shoulder joint 121 and to the second arm link 124 by an elbow joint 123, and the second arm link 124 is connected to the hand 13 by a carpal joint 125. The shoulder joint 121 has degrees of freedom of rotation about the roll axis, the pitch axis and the yawing axis. The elbow joint 123 has a degree of freedom of rotation about the pitch axis. The carpal joint 125 has degrees of freedom of rotation about the roll axis, the pitch axis and the yawing axis. A six-axis force sensor 106 is provided near the carpal joint 125.

The leg 14 comprises a first leg link 142, a second leg link 144 and a foot 146. The first leg link 142 is connected to the trunk 10 by a hip joint 141 and to the second leg link 144 by a knee joint 143, and the second leg link 144 is connected to the foot 146 by an ankle joint 145. The hip joint 141 has degrees of freedom of rotation about the roll axis, the pitch axis and the yawing axis. The knee joint 143 has a degree of freedom of rotation about the pitch axis. The ankle joint 145 has degrees of freedom of rotation about the roll axis and the pitch axis.

The hand 13 has a palm and five finger mechanisms 131 to 135 extending from the palm, which correspond to the thumb, the forefinger, the middle finger, the third finger and the little finger of the human hand. The first finger mechanism 131 is opposed to the other four finger mechanisms 132 to 135, which are arranged side by side.

The first finger mechanism 131 comprises three link members corresponding to the first metacarpal bone and the proximal phalanx and the distal phalanx of the thumb of the human hand and a resilient cover covering the three link members. Viewed from the palm, the three link members are connected to each other by a joint corresponding to the joint at the proximal end of the first metacarpal bone of the human hand, a joint corresponding to the metacarpophalangeal joint of the human thumb, and a joint corresponding to the interphalangeal joint of the human thumb. The first finger mechanism 131 can be bent at the joints according to the power transferred from a motor housed in the palm via a power transmission mechanism constituted by a reduction gear or the like. The power transferred from the motor to the first finger mechanism 131 is controlled by the control system 20.

The finger mechanisms 132 to 135 are configured the same as the finger mechanisms described in Japanese Patent Laid-Open No. 2003-181787, for example, and have substantially the same configuration. For example, the fifth finger mechanism 135 comprises three link members corresponding to the proximal phalanx, the middle phalanx and the distal phalanx of the little finger of the human hand and a resilient cover covering the three link members. The three link members are connected to each other by joints corresponding to the metacarpophalangeal joint, the proximal interphalangeal joint and the distal interphalangeal joint of the little finger of the human hand, viewed from the palm. The fifth finger mechanism 135 can be bent inwardly at the joints according to the power transferred from a motor (not shown) serving as a power source via a power transmission mechanism. The power transferred from the motor to the fifth finger mechanism 135 is controlled by the control system 20 as with the first finger mechanism 131.

Some of the finger mechanisms 131 to 135 may be driven by a single common motor. Alternatively, as with the first finger mechanism 131 according to this embodiment, each finger mechanism may be driven by a dedicated motor. Furthermore, the power transmission mechanism may be any mechanism that can transfer the power of the motor to each finger mechanism to bend and stretch the finger mechanism, such as a wire and a pulley, as described in the Japanese Patent Laid-Open No. 2003-181787 described above.

The control system 20 is composed of a CPU, a ROM, a RAM, an I/O and the like and controls the operation of the robot 1 by controlling the operation of an actuator 108 (or an electric motor) based on images obtained by the waist camera 101 and the cameras 102, the output of a rotary encoder 104, which indicates the angle of each joint of the arms 12, the legs 14 and the like of the robot 1, the output of the six-axis force sensors 106 that detect the force exerted on the hands 13, and the like. The control system may be a distributed control system composed of a main control unit and one or more sub-control units interconnected via an internal network in the robot 1.

A "control program" that makes a computer mounted in the robot 1 function as the control system 20 may be previously stored in a memory or may be delivered (downloaded) or broadcasted to the computer from a server via a network or an artificial satellite at an arbitrary timing, such as in response to a request from the robot 1, and stored in a memory for the program.

The control system 20 comprises a first recognition processing section 211, a second recognition processing section 212, a primary confirmation processing section 221, a secondary confirmation processing section 222 and a tertiary confirmation processing section 223.

The first recognition processing section 211 recognizes the position and posture of an object, such as the handle H of the cart C shown in FIG. 1, as "external information" based on the output signal of the waist camera (first sensor) 101 and the image signal from the head camera (first sensor) 102.

The second recognition processing section 212 recognizes, as "internal information", the position and posture of the handle H in the case where the handle H is assumed to be properly grasped based on the posture of the robot 1 determined by the output of the rotary encoders (second sensor) 104 attached to the joints 121, 123, 125, 141, 143, 145 and the like, the length of the links 122, 124, 142, 144 and the like, and the like.

The primary confirmation processing section 221 determines whether or not a "primary grasping condition" that the external information recognized by the first recognition processing section 211 and the internal information recognized by the second recognition processing section 212 agree with each other is satisfied.

The secondary confirmation processing section 222 makes the position, the posture or the position and posture (referred to as "position or the like" as required hereinafter) of the hands 13 of the robot 1 in the stationary state vary in the case where the primary confirmation processing section 221 determines that the primary grasping condition is satisfied. In addition, the secondary confirmation processing section 222 measures the direction and magnitude of the force exerted by the hands 13 on the handle H based on the output signal of the six-axis force sensors 106 (the measurement is equivalent to the measurement of the direction and magnitude of the reaction force exerted by the handle H on the hands 13). Then, the secondary confirmation processing section 222 determines whether or not a "secondary grasping condition" that the measured direction and magnitude agree with a first target direction and a first target value, respectively, is satisfied.

The tertiary confirmation processing section 223 makes the position or the like of the hands 13 vary after the robot 1 starts moving, in the case where the secondary confirmation processing section 222 determines that the secondary grasping condition is satisfied. In addition, the tertiary confirmation processing section 223 measures the direction and magnitude of the force exerted by the hands 13 on the handle H based on the output signal of the six-axis force sensors 106. Furthermore, the tertiary confirmation processing section 223 determines whether or not a "tertiary grasping condition" that the measured direction and magnitude agree with a second target direction and a second target value, respectively, is satisfied.

Now, with reference to FIGS. 3 to 6, there will be described a function of the robot 1 configured as described above, specifically, a function of determining whether an object, such as the handle H of the cart C, is properly grasped or not.

Figure 3:
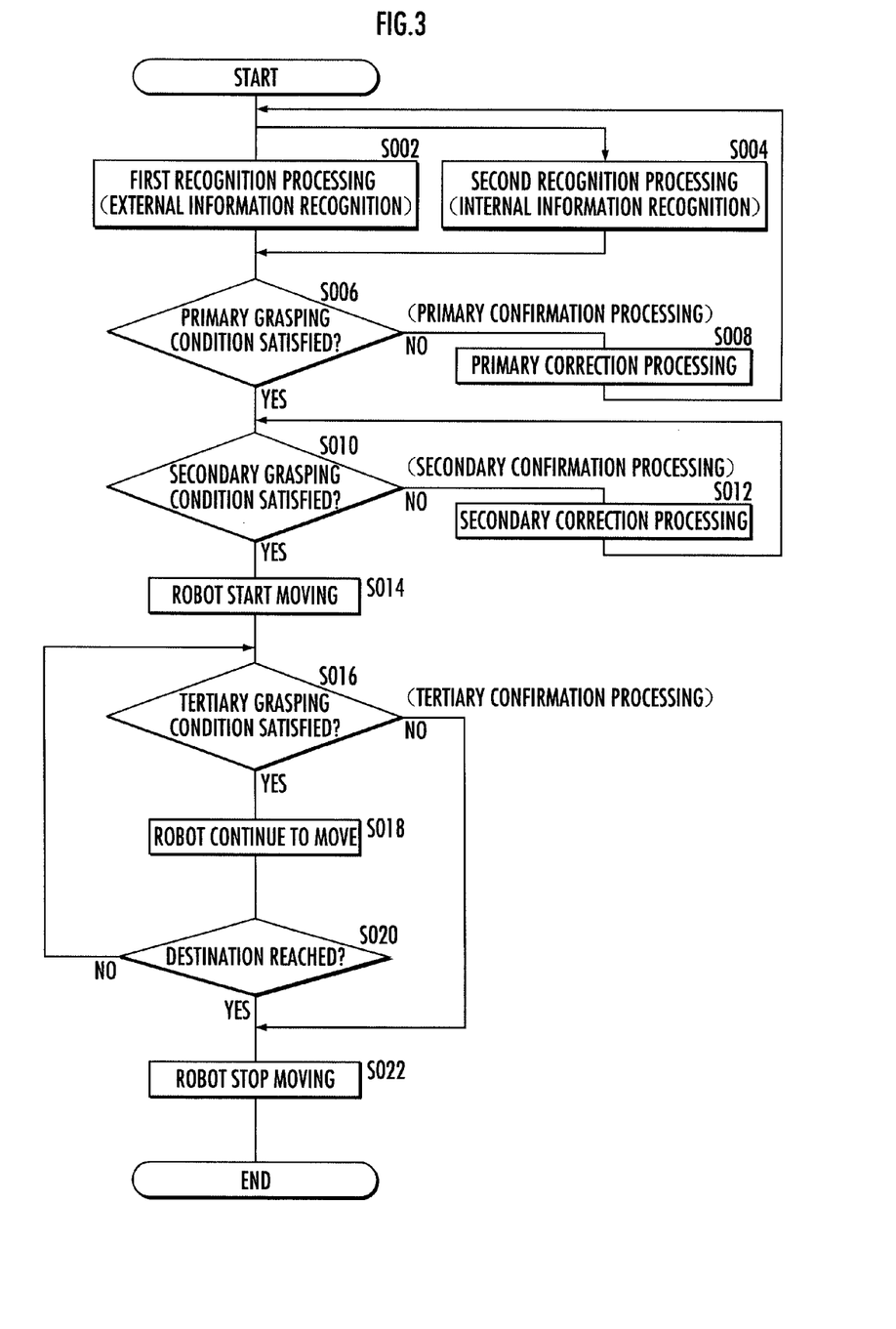
FIG. 3 is a diagram for illustrating the function of the robot according to the present invention.
Figure 4:
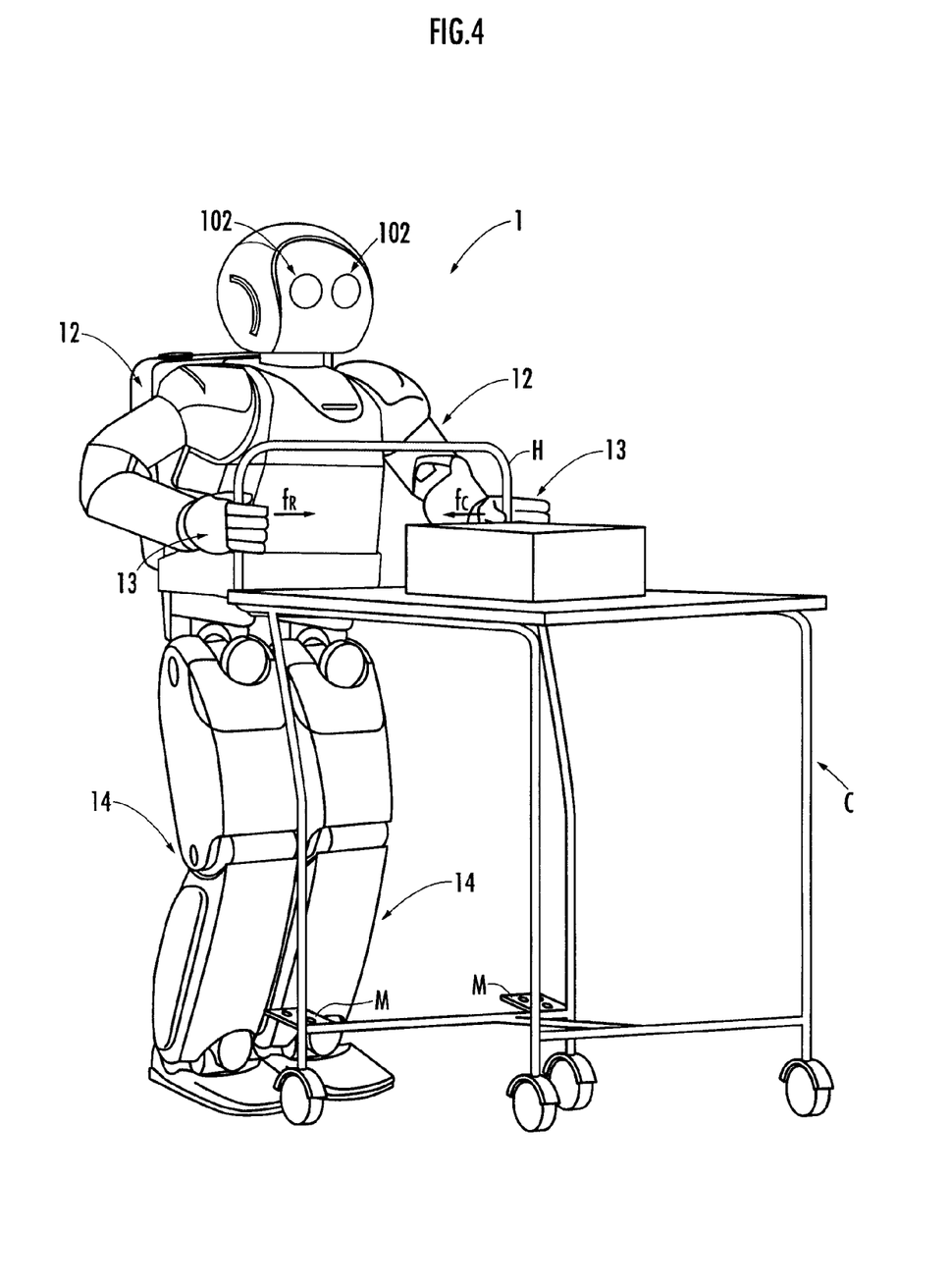
FIG. 4 is a diagram for illustrating the function of the robot according to the present invention.

The first recognition processing section 211 performs a "first recognition processing" to recognize the position and posture of an object, such as the handle H, as "external information" based on the output signal or image signal from the waist camera (first sensor) 101 or the like (S002 in FIG. 3).

For example, the position and posture of a plurality of marks (which is coated with paint that reflects near-infrared light) M attached to the cart C shown in FIG. 1 are measured based on the output signal of the waist camera 101. In addition, the position and posture of the cart C are measured based on the output signal of the head cameras 102. Since the waist camera 101 and the head cameras 102 are used in combination, when the head cameras 102 can hardly detect the position or the like of the cart C because of darkness, the position and posture of the marks M and therefore the position and posture of the handle H can be detected by the waist camera 101. The same applies to the reverse case. The position of each mark M is represented by coordinates $(X_1, Y_1, Z_1)$ in a robot coordinate system with the origin O located at the center of gravity or the like of the robot 1, the X-Y plane defined by a fundamental horizontal plane of the robot 1, the Y-Z plane defined by a fundamental sagittal plane of the robot 1, and the Z-X plane defined by a fundamental frontal plane of the robot 1. Based on the coordinates of the waist camera 101 in the robot coordinate system and the coordinates (X', Y', Z') of each mark M in an object coordinate system with the origin O' located at a point near the handle H shown in FIG. 1, the coordinates of the handle H can be recognized. Line segments connecting the marks M and tilt angles $\theta_{1X}$, $\theta_{1Y}$, $\theta_{1Z}$ of the handle H parallel to the line segments with respect to the coordinate axes are recognized as the posture of the handle H.

In addition, the second recognition processing section 212 performs a "second recognition processing" to recognize, as "internal information", the position and posture of the handle H in the case where the handle H is assumed to be properly grasped by the hands 13 based on the posture of the robot 1 based on the output signal of the rotary encoders (second sensor) 104 (S004 in FIG. 3).

For example, based on the coordinates $(X_{2L}, Y_{2L}, Z_{2L})$ and $(X_{2R}, Y_{2R}, Z_{2R})$ of the left and right carpal joints 125 in the robot coordinate system, the coordinates $(X_2, Y_2, Z_2)$ of the midpoint of the handle H and the tilt angles $\theta_{2X}, \theta_{2Y}, \theta_{2Z}$ of the handle H with respect to the coordinate axes, which are used as the internal information, are calculated or recognized as represented by the following formulas (1) and (2a) to (2c). The coordinates of the left and right carpal joints 125 in the robot coordinate system can be measured or recognized based on the shoulder joint angles determined by the output of the rotary encoders 104 at the left and right shoulder joints 121, which are fixed points in the robot coordinate system, the elbow joint angles determined by the output of the rotary encoders 104 at the left and right elbow joints 123, and the lengths of the left and right first arm links 122 and the left and right second arm links 124, which are previously stored in a memory.

$$(X_2, Y_2, Z_2) = ((X_{2L}+X_{2R})/2, (Y_{2L}+Y_{2R})/2, (Z_{2L}+Z_{2R})/2) \quad (1)$$

$$\theta_{2X} = \tan^{-1}\{(Y_2^2+Z_2^2)^{1/2}/X_2\} \quad (2a)$$

$$\theta_{2Y} = \tan^{-1}\{(Z_2^2+X_2^2)^{1/2}/Y_2\} \quad (2b)$$

$$\theta_{2Z} = \tan^{-1}\{(X_2^2+Y_2^2)^{1/2}/Z_2\} \quad (2c)$$

The "external information" and the "internal information" may be recognized with reference to an object coordinate system defined with a specific point in an object, such as the cart C as a reference point, or a coordinate system at rest defined with a stationary rest point as a reference point, rather than the robot coordinate system.

Then, the primary confirmation processing section 221 performs a "primary confirmation processing" to determine whether or not the "primary grasping condition" that the external information recognized by the first recognition processing section 211 agrees with the internal information recognized by the second recognition processing section 212 is satisfied (S006 in FIG. 3). The primary confirmation processing may be performed after the grasping operation of the hands 13 that involves bending of the finger mechanisms 131 to 135. Specifically, whether the external information and the internal information agree with each other is determined based on whether all the following inequalities (3) and (4a) to (4c) hold or not.

$$(X_2-X_1)^2+(Y_2-Y_1)^2+(Z_2-Z_1)^2 = \delta \quad (3)$$

$$|\theta_{2X}+\theta_{1X}| = \epsilon_X \quad (4a)$$

$$|\theta_{2Y}+\theta_{1Y}| = \epsilon_Y \quad (4b)$$

$$|\theta_{2Z}+\theta_{1Z}| = \epsilon_Z \quad (4c)$$

In these formulas, symbols $\delta$, $\epsilon_X$, $\epsilon_Y$ and $\epsilon_Z$ represent small positive values. The formula (3) is given taking into account the fact that the reference coordinates of the handle H and the coordinates of the midpoint between the left and right carpal joints 125 of the robot 1 substantially agree with each other when the hands 13 improperly grasp the handle H. The formulas (4a) to (4c) are given by taking into account the fact that the handle H and the line segment connecting the left and right carpal joints 125 of the robot 1 are substantially parallel to each other when the robot 1 properly grasps the handle H.

If the primary confirmation processing section 221 determines that the primary grasping condition is not satisfied, or in other words, the external information and the internal information don't agree with each other (if NO in S006 in FIG. 3), a "primary correction processing" is performed (S008 in FIG. 3). In this step, some or all of retry of grasping of the handle H by the hands 13, adjustment of the rising position and orientation of the robot 1 through operation control of the left and right legs 14, and adjustment of the position and posture of the left and right hands 13 through operation control of the left and right arms 12 are performed. After that, the first recognition processing, the second recognition processing and the primary confirmation processing are performed again (see S002, S004 and S006 in FIG. 3).

On the other hand, if the primary confirmation processing section 221 determines that the primary grasping condition is satisfied, or in other words, the external information and the internal information agree with each other (if YES in S006 in FIG. 3), the secondary confirmation processing section 222 performs a "secondary confirmation processing" to determine whether or not the handle H is properly grasped when the robot 1 is in the stationary state (S010 in FIG. 3). In this specification, when it is described that an object is "properly" grasped, it means that that the robot 1 grasps the handle H of the cart C, for example, with the hands 13 in such a manner that the cart C moves together with the robot 1 when the robot 1 moves.

Specifically, the secondary confirmation processing section 222 makes either or both of the position and posture of the handle H vary when the robot 1 is in the stationary state. As a result, for example, as indicated by arrows in FIG. 4, forces $f_L$ and $f_R$ are exerted by the left and right hands 13 on the handle H, respectively. The secondary confirmation processing section 222 determines whether the handle H is properly grasped or not based on whether the result of detection of forces by the six-axis force sensors 106 attached to the hands 13 meets the "secondary grasping condition" or not.

Figure 5A:
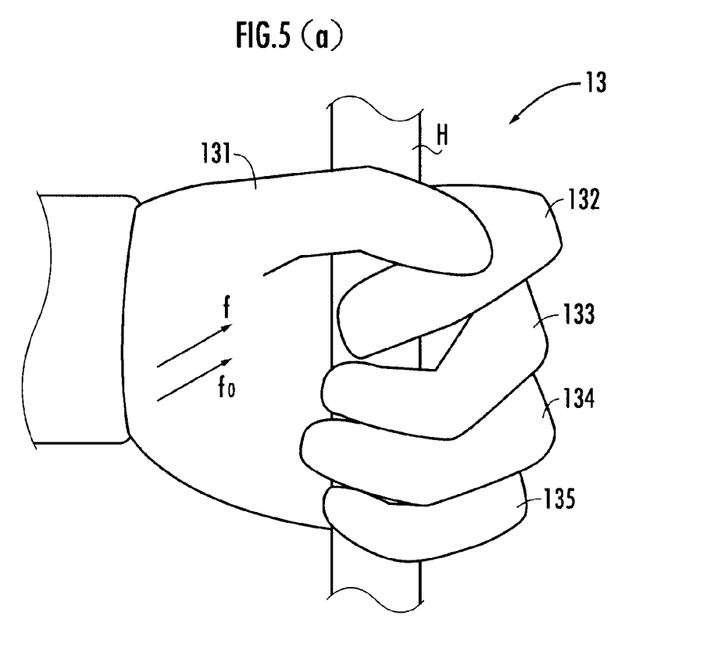
FIG. 5 is a diagram for illustrating the function of the robot according to the present invention.

For example, consider a condition where the handle H is firmly grasped by the five finger mechanisms 131 to 135 as shown in FIG. 5(a). In this condition, if the position or the like of the hand 13 varies, the force detected by the six-axis force sensor 106, or in other words, the reaction force exerted on the hand 13 by the handle H increases, slightly decreases and then becomes steady as shown by the solid line in FIG. 6. In addition, the direction and magnitude of the force f in the steady state measured by the six-axis force sensor 106 agree with the direction (first target direction) and magnitude (first target value) of a first target force $f_{10}$. The agreement in direction between the forces means that the magnitude of the deviation between the directions of the forces (represented by the angle between the two force vectors) is equal to or lower than a threshold. Similarly, the agreement in magnitude between the forces means that the magnitude of the deviation between the magnitudes of the forces is equal to or lower than a predetermined threshold. Thus, it is determined that the result of detection of the force by the six-axis force sensor 106 meets the secondary grasping condition, and therefore, the handle H is "properly" grasped. The secondary grasping condition may require that only the direction of the force measured by the six-axis force sensor 106 agree with the first target direction, rather than that both the direction and magnitude of the measured force agree with the first target direction and the first target value, respectively.

Figure 5B:
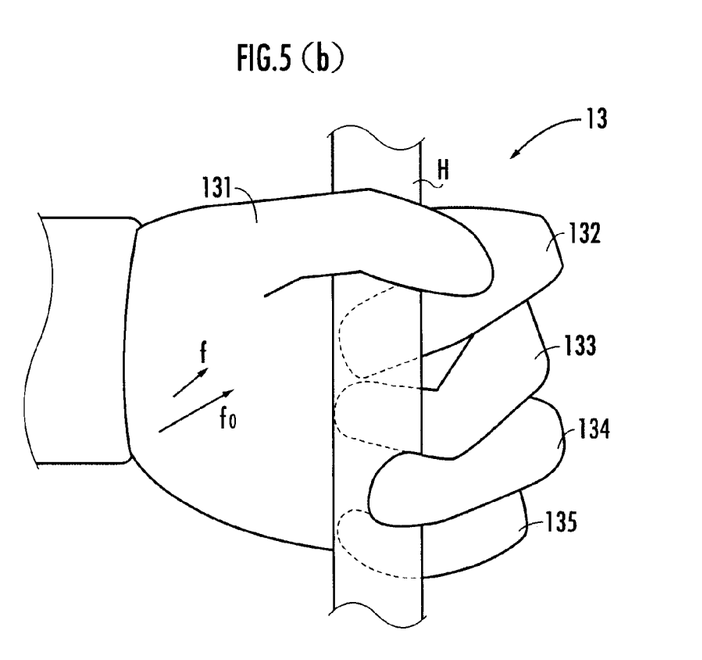
Figure 6:
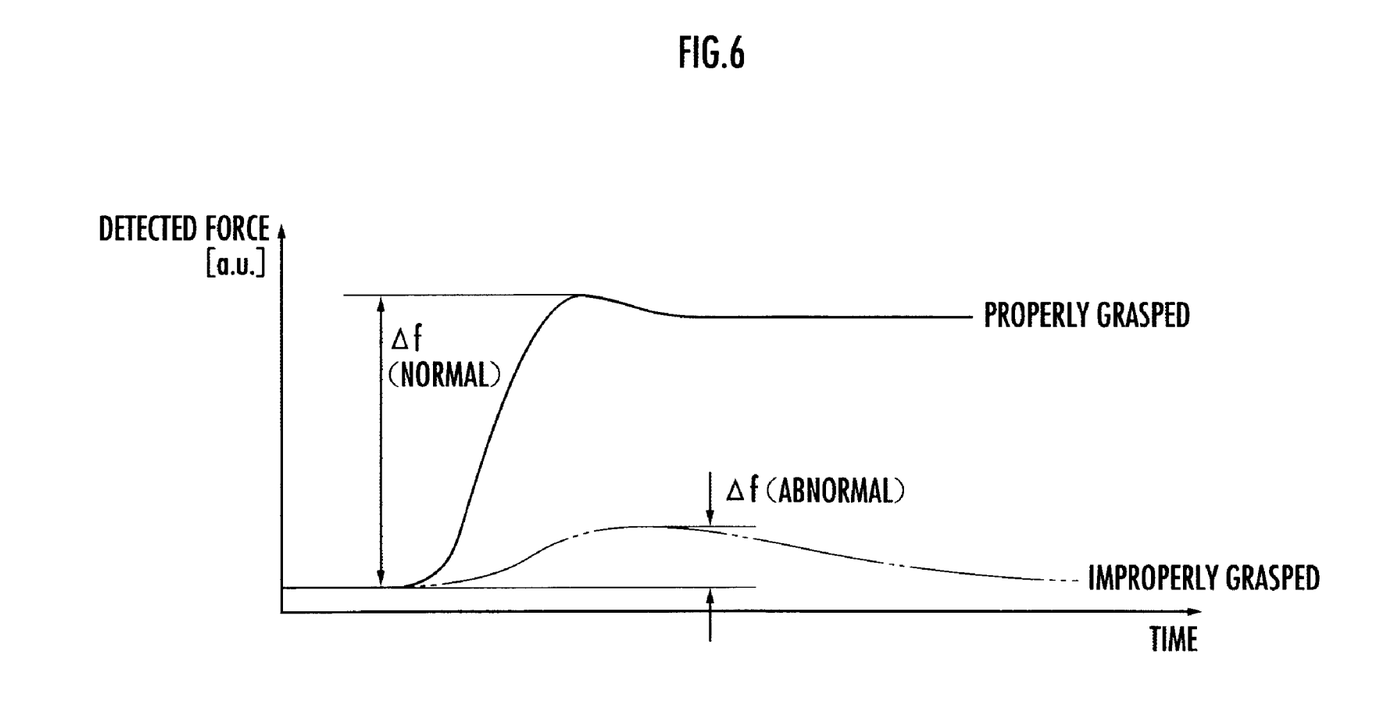
FIG. 6 is a diagram for illustrating the function of the robot according to the present invention.

Next, consider a condition where the handle H is not firmly grasped by the five finger mechanisms 131 to 135 as shown in FIG. 5(b). In this condition, if the position or the like of the hand 13 varies, the force detected by the six-axis force sensor 106 slowly increases and then becomes unsteady as shown by the alternate long and short dash line in FIG. 6. In addition, the direction and magnitude of the force vector f in the steady state measured by the six-axis force sensor 106 don't agree with the direction (first target direction) and magnitude (first target value) of the first target force vector $f_{10}$, respectively. Thus, it is determined that the result of detection of the force by the six-axis force sensor 106 does not meet the primary grasping condition, and therefore, the handle H is "improperly" grasped.

If the secondary confirmation processing section 222 determines that the secondary grasping condition is not satisfied, or in other words, the handle H is improperly grasped (if NO in S010 in FIG. 3), a "secondary correction processing" is performed (S012 in FIG. 3). In this step, some or all of retry of grasping of the handle H by the hands 13, adjustment of the rising position and orientation of the robot 1 through operation control of the left and right legs 14, and adjustment of the position and posture of the left and right hands 13 through operation control of the left and right arms 12 are performed. After that, the secondary confirmation processing is performed again (see S010 in FIG. 3). The primary correction processing and the secondary correction processing may be the same or different.

In the secondary confirmation processing, the position or the like of the hands 13 may be changed in a plurality of patterns so that a plurality of types of forces different in direction, magnitude or direction and magnitude are exerted on the handle H from the hands 13, and it may be determined whether the handle H is properly grasped by the hands 13 or not based on a comprehensive evaluation of the results of force detection for the respective change patterns of the position or the like of the hands 13. In this case, for example, it can be determined whether the handle H is properly grasped or not based on the direction and magnitude of the force exerted on the hands 13 when the robot 1 moves the arms 12 or the like to wheel the cart C forward, backward or sideward.

On the other hand, if the secondary confirmation processing section 222 determines that the secondary grasping condition is satisfied, or in other words, the handle H is properly grasped (if YES in S010 in FIG. 3), the control system 20 makes the robot 1 start moving (S014 in FIG. 3), and the tertiary confirmation processing section 223 performs a "tertiary confirmation processing" to determine whether the handle H is properly grasped or not (S016 in FIG. 3).

Specifically, the tertiary confirmation processing section 223 makes either or both of the position and posture of the handle H vary after the robot 1 starts moving. Then, the tertiary confirmation processing section 223 determines whether the handle H is properly grasped or not based on whether the result of detection of forces by the six-axis force sensors 106 attached to the hands 13 meets the "tertiary grasping condition" or not. The tertiary grasping condition may require that both the direction and magnitude of the force measured by the six-axis force sensor 106 agree with a second target direction and a second target value, respectively, or that the direction of the measured force agree with the second target direction. The "second target direction" and the "second target value" in the tertiary grasping condition may be the same as or different from the "first target direction" and the "first target value" in the secondary grasping condition, respectively.

In the tertiary confirmation processing, the position or the like of the hands 13 may be changed in a plurality of patterns so that a plurality of types of forces different in direction, magnitude or direction and magnitude are exerted on the handle H from the hands 13, and it may be determined whether the handle H is properly grasped by the hands 13 or not based on a comprehensive evaluation of the results of force detection for the respective change patterns of the position or the like of the hands 13.

If the tertiary confirmation processing section 223 determines that the grasping conduction is proper (if YES in S016 in FIG. 3), the control system 20 allows the robot 1 to continue to move (S018 in FIG. 3). Thus, the robot 1 moves to a destination along a planned route while wheeling or hauling the cart C with the handle H grasped by the hands 13. The control system 20 also determines whether or not the robot 1 has reached the destination (S020 in FIG. 3). Whether or not the robot 1 has reached the destination is determined based on whether or not the distance (in the X-Y plane) between the origin of the robot coordinate system and the position of a marker provided near the destination in the robot coordinate system measured by the waist camera 101 or the head cameras 102 is equal to or less than a threshold.

If the control system 20 determines that the robot 1 has not reached the destination (if NO in S020 in FIG. 3), the tertiary confirmation processing section 223 performs the tertiary confirmation processing again (see S016 in FIG. 3). On the other hand, if the control system 20 determines that the robot 1 has reached the destination (if YES in S020 in FIG. 3), the control system 20 makes the robot 1 stop moving or stop the operation for moving (S022 in FIG. 3). Similarly, if the tertiary confirmation processing section 223 determines that the handle is improperly grasped (if NO in S016 in FIG. 3), the control system 20 makes the robot 1 stop moving or stop the operation for moving (S022 in FIG. 3).

In the primary confirmation processing, the robot 1 that serves the functions described above determines whether an object is properly grasped or not based on whether the primary grasping condition concerning the agreement between the external information and the internal information is satisfied or not (see S006 in FIG. 3). Furthermore, in the secondary confirmation processing, the robot 1 determines whether the handle H is grasped properly or not based on whether the "secondary grasping condition" concerning the result of detection of forces by the six-axis force sensors 106 in the case where the position or the like of the hands 13 is changed when the robot 1 is in the stationary state is satisfied or not (see S010 in FIG. 3). The robot 1 can confirm whether the hands 13 properly grasp the handle H or not based on such dual determinations. The confirmation allows the robot 1 to start moving with the handle H grasped by the hands. Furthermore, it is possible to prevent the robot 1 from colliding with the cart C because the robot 1 starts moving while the handle H is improperly grasped and therefore the hands 13 are separated from the handle H, for example.

In addition, in the tertiary confirmation processing, it is determined whether the handle H is properly grasped or not based on whether the "tertiary grasping condition" concerning the result of detection of forces by the six-axis force sensors 106 in the case where the position or the like of the hands 13 is changed after the robot 1 starts moving is satisfied or not (see S016 in FIG. 3). Thus, it is possible to recognize, with reliability, a situation in which the handle H, which has been "properly" grasped when the robot 1 is in the stationary state, becomes "improperly" grasped after the robot 1 starts moving because the hands 13 are separated from the handle H.

If it is determined that the tertiary grasping condition is not satisfied after the robot 1 starts moving, or in other words, the handle H is "improperly" grasped by the hands 13, the operation for moving of the robot 1 is stopped (see S016 (NO) and S022 in FIG. 3). Thus, at least the operation of the legs 14 is stopped. However, the arms 12 can continue to move as required. Thus, it is possible to prevent the robot 1 from continuing to move in spite of the handle H being improperly grasped and therefore colliding with the cart C.

Furthermore, if it is determined that the handle H is improperly grasped based on the direction or the like of the force exerted on the hands 13, the position or the like of the hands 13 is changed, and then the same determination is repeated (see S010 and S012 in FIG. 3). Thus, even in a situation in which it is determined that the handle is improperly grasped based on the force exerted on each of a plurality of hands 13 although the internal information and the external information agree with each other, the operation of the robot 1 can be appropriately corrected in such a manner that the handle H is properly grasped.

The method described above can also be used to check whether the robot 1 properly grasps any kind of object on a table, such as a tray, a file and a box, rather than the handle H of the cart C (see FIG. 1).

In the embodiment described above, the six-axis force sensors 106 are used to detect or measure the force exerted by the handle H on the hands 13, or in other words, the force exerted by the hands 13 on the cart C via the handle H. In another embodiment, alternatively, the force F exerted by the hands 13 on the cart C can be measured based on an image obtained by an image pickup device, such as the head cameras 102. In this case, the acceleration $\alpha$ of the cart C can be measured from the image, the mass m of the cart C and dynamic friction force f' of the cart C with the floor surface can be read from a memory, and the force F ($=m\cdot\alpha-f'$) exerted by the robot 1 on the cart C can be determined based on the values of these parameters.

Furthermore, the secondary confirmation processing section 222 can determine whether the secondary grasping condition is satisfied or not while controlling the operation of the robot 1 in such a manner that the resultant of the forces exerted by the left and right hands 13 on the handle H equals to 0. In this case, if the handle H is properly grasped, it is possible to avoid reduction of accuracy of the determination and collision of the cart C with the robot 1 due to an unwanted movement of the cart C during the determination.

What is claimed is:

1. A robot having a control system and functions of autonomously moving and using at least one hand to grasp an object under the control of the control system,
   wherein said control system comprises:
   a first recognition processing section configured to recognize, as external information, a position and posture of said object based on an output signal of a first sensor that measures the position and posture of said object;
   a second recognition processing section configured to recognize, as internal information, the position and posture of the object in a case where the object is assumed to be properly grasped by said at least one hand based on an output signal of a second sensor that measures a position and posture of said at least one hand;
   a primary confirmation processing section configured to determine whether a primary grasping condition is satisfied, said primary grasping condition being that the external information recognized by the first recognition processing section and the internal information recognized by the second recognition processing section agree with each other; and
   a secondary confirmation processing section configured to measure one of a direction and a direction and magnitude of a force exerted by the at least one hand on the object when at least one of a position and posture of the at least one hand is changed when said robot is in a stationary state based on one of an image of the object obtained by an image pickup device mounted on the robot and an output signal of a force sensor provided in the at least one hand, the second confirmation processing section being configured to determine whether a secondary grasping condition is satisfied in a case where the primary confirmation processing section determines that the primary grasping condition is satisfied, said secondary grasping condition being that one of the direction of the force agrees with a first target direction, and the direction and magnitude of the force agree with the first target direction and a first target value.

2. The robot according to claim 1, wherein said secondary confirmation processing section determines whether the object is properly grasped by the at least one hand while controlling an operation of said robot in such a manner that a resultant of the forces exerted by said at least one hand on said object equals to 0.

3. The robot according to claim 1, wherein said control system further comprises a tertiary confirmation processing section that changes at least one of the position and posture of the at least one hand after said robot starts moving, measures one of the direction and the direction and magnitude of a force exerted by the at least one hand on the object based on one of an image of the object obtained by said image pickup device and an output signal of said force sensor, and determines whether a tertiary grasping condition is satisfied in a case where said secondary confirmation processing section determines that said object is properly grasped by the at least one hand while satisfying the secondary grasping condition, said tertiary grasping condition being that one of the direction of the force exerted agrees with a second target direction, and the direction and magnitude of the force agree with the second target direction and a second target value.

4. The robot according to claim 3, wherein said control system stops an operation for moving of said robot in a case where said tertiary confirmation processing section determines that said tertiary grasping condition is not satisfied.

5. The robot according to claim 3, wherein the second target direction and the second target value are a predetermined direction and value, respectively, associated with a proper grasp of the object by the at least one hand.

6. The robot according to claim 1, wherein, in a case where said secondary confirmation processing section determines that said secondary grasping condition is not satisfied, said control system controls an operation of said robot in such a manner that at least one of the position and the posture of the at least one hand is changed, and then, said secondary confirmation processing section determines again whether the object is properly grasped by the at least one hand.

7. The robot according to claim 1, further comprising:
a computer installed in the robot, and
a program that makes said computer function as said control system.

8. The robot according to claim 1, wherein the object is grasped by wrapping the at least one hand around the object.

9. The robot according to claim 1, wherein each hand includes a palm and a plurality of finger mechanisms extending from the palm, and the object is grasped by placing the palm into abutment with the object and wrapping the fingers around the object.

10. The robot according to claim 1, wherein the first target direction and the first target value are a predetermined direction and value, respectively, associated with a proper grasp of the object by the at least one hand.

11. The control method according to claim 1, wherein the first target direction and the first target value are a predetermined direction and value, respectively, associated with a proper grasp of the object by the at least one hand.

12. A control method for a robot that has functions of autonomously moving and using at least one hand to grasp an object,
wherein the control method comprises:
a step of performing first recognition processing for recognizing a position and posture of said object as external information based on an output signal of a first sensor that measures the position and posture of said object;
a step of performing second recognition processing for recognizing, as internal information, the position and posture of the object in a case where the object is assumed to be properly grasped by said at least one hand based on an output signal of a second sensor that measures a position and posture of said at least one hand;
a step of performing primary confirmation processing for determining whether a primary grasping condition is satisfied, said primary grasping condition being that the external information recognized in the first recognition processing and the internal information recognized in the second recognition processing agree with each other; and
a step of performing secondary confirmation processing for measuring one of a direction and a direction and magnitude of a force exerted by the at least one hand on the object when at least one of a position and posture of the at least one hand is changed when said robot is in a stationary state based on one of an image of the object obtained by an image pickup device mounted on the robot and an output signal of a force sensor provided in the at least one hand, the second confirmation processing determining whether a secondary grasping condition is satisfied in a case where the primary confirmation processing section determines that the primary grasping condition is satisfied, said secondary grasping condition being that one of the direction of the force agrees with a first target direction, and the direction and magnitude of the force agree with the first target direction and a first target value, respectively.

13. The control method according to claim 12, wherein the object is grasped by wrapping the at least one hand around the object.

14. The control method according to claim 12, wherein each hand of the robot includes a palm and a plurality of finger mechanisms extending from the palm, and wherein the object is grasped by placing the palm into abutment with the object and wrapping the fingers around the object.

* * * * *